H. V. GIBSON.
CLUTCH.
APPLICATION FILED JAN. 6, 1917.
1,282,808.
Patented Oct. 29, 1918.
2 SHEETS—SHEET 1.
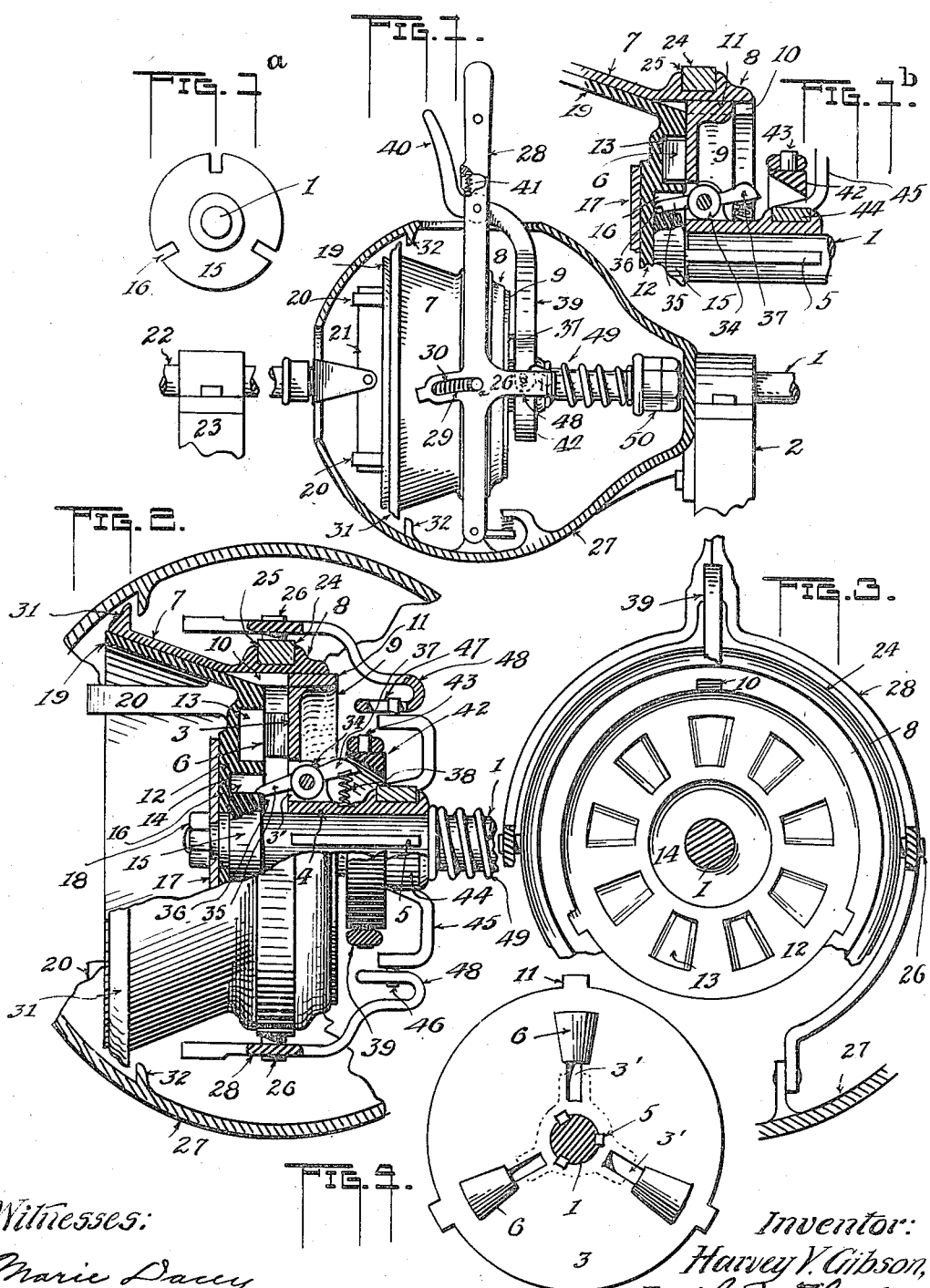
Witnesses:
Marie Darcy
Louise H. Masch
Inventor:
Harvey V. Gibson,
By L. M. Thurlow
Atty.

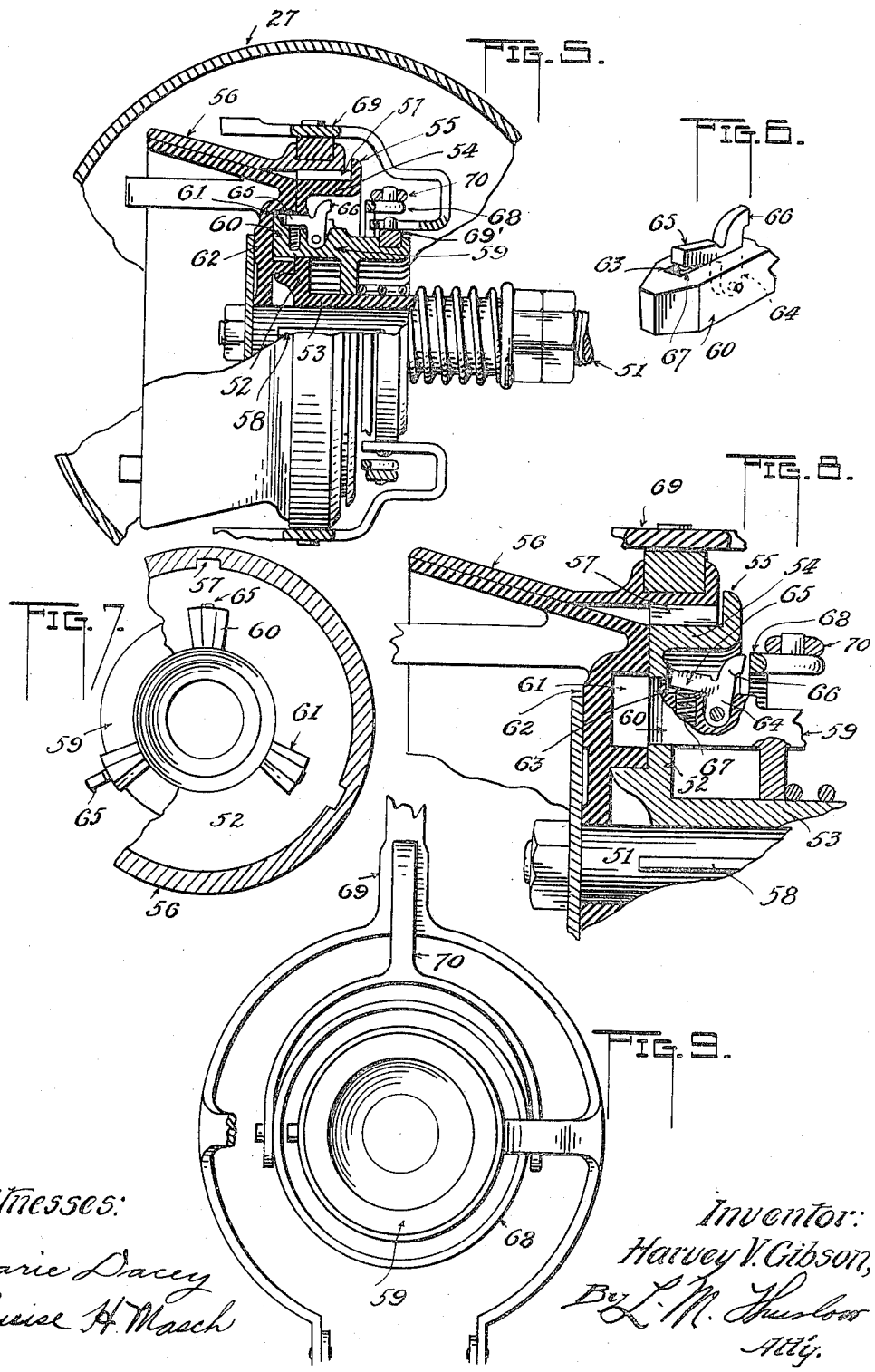

UNITED STATES PATENT OFFICE.

HARVEY V. GIBSON, OF PEORIA, ILLINOIS.

CLUTCH.

1,282,808.　　　　　Specification of Letters Patent.　　Patented Oct. 29, 1918.

Application filed January 6, 1917. Serial No. 141,037.

*To all whom it may concern:*

Be it known that I, HARVEY V. GIBSON, citizen of the United States, residing at Peoria, in the county of Peoria and State of Illinois, have invented certain new and useful Improvements in Clutches; and I do hereby declare that the following is a full, clear, and exact description of the invention, which will enable others skilled in the art to which it appertains to make and use the same.

This invention relates to clutches. It pertains more particularly to a clutch employed between driving and driven members whereby when the driven member is placed under overload and damage is likely to result thereto it will be automatically disengaged from the driving member.

My type of clutch includes the automatic disengagement of the parts and a manually operated friction control whereby the load may be taken up gradually, the clutch portions being afterward allowed to be moved into engagement.

The object of the invention is to provide a clutch of this nature having the advantages named in which few parts are used in a very simple arrangement.

Another object is to provide a new means for positively locking apart the clutch portions after their separation and to include simple mechanism to operate said means in restoring the parts for action.

Another object is to provide a different arrangement from those shown in my Letters Patent No. 1,208,136, issued Dec. 12, 1916, and in my copending application No. 78,528, filed Feb. 15, 1916, for holding the parts of the clutch separated after their automatic disengagement by providing mechanism movable parallel to the axis of rotation of the clutch for effecting reëngagement instead of operating a member partially rotatable with respect to the main clutch portions.

Other objects and advantages will appear in the following specification including a description of novel arrangement of parts. The accomplishment of the above objects is obtained in the construction and arrangement substantially as described hereinafter and then sought to be defined by the appended claims, the drawings showing for the purpose of illustration, two of the embodiments of my invention, it being understood, however, that changes may be made in practice within the scope of the claims without digressing from my inventive idea.

Figure 1 is an elevation of my improved clutch.

Fig. 1ª is an end elevation of a shaft and plate rotatable therewith.

Fig. 1ᵇ is a detail of parts of the clutch in longitudinal section shown on an enlarged scale.

Fig. 2 is a longitudinal section of parts of the clutch showing different positions of some of the elements from that shown in Fig. 1ᵇ.

Fig. 3 is an end elevation of one of the clutch members and certain hand-operated portions.

Fig. 4 is an end elevation of another clutch portion adapted to engage that shown in Fig. 3.

Fig. 5 is a view similar to Fig. 2 showing certain modifications.

Fig. 6 shows one of the fingers of one of the clutch portions and a dog pivoted therein.

Fig. 7 is an end elevation of a clutch ring and other parts in connection therewith.

Fig. 8 is an enlarged detail in longitudinal section of parts shown in Fig. 5, certain of the elements being shown in a different position from that illustrated in said Fig. 5; and, Fig. 9 is an end elevation of certain lever mechanism.

In the first four figures the numeral 1 indicates a shaft supported in a bearing 2 and carrying on its extremity the clutch mechanism. This mechanism includes a clutch portion comprising a plate 3 having a face disposed in a plane perpendicular to the axis of rotation of the shaft, the same being part of a sleeve 4 secured on said shaft and rotatable therewith through any suitable means such, for example, as one or more feathers 5.

Extending from the said plate is a series of fingers 6, Fig. 4, equally spaced from one another upon said plate and having tapered extremities substantially of a well known construction or as shown in Fig. 6. 7 is a friction cone including a portion 8 having a cylindrical bore and engaging over an extended cylindrical flange 9 of the plate 3.

The said portion 8 is provided with one or more key-ways 10, Fig. 3, and receives extending lugs 11 on the periphery of the described flange 9 whereby in the rotation of the clutch member 3, the said friction cone will be rotated but which at the same time can have movement longitudinally of said flange.

12 is the other clutch portion which is centrally bored to fit upon the shaft 1. It is provided in its face adjacent the clutch member 3 with a series of sockets or depressions 13 whose opposite walls are beveled, the bottoms of the sockets thus being narrower than at the face of said clutch portion, the tapered surfaces of the fingers 6 corresponding thereto.

Centrally of said clutch portion 12 is a recess 14 to receive a notched plate 15 rotatable with the shaft and which may be a part of it or may be secured thereto. It is provided with notches 16 in its periphery as shown in Fig. 1$^a$. 17 is a plate lying against the outer face of the said clutch portion and by means of a nut 18 the latter by means of said plate is held upon the shaft but is free to rotate relative to it.

19 is a coned part of the clutch portion 12 and lies within the cone 7 and included with the portion 12 are two lugs 20 as part of a knuckle 21 mounted upon a shaft 22 carried in a bearing 23, all of which is a well known structure as shown in my said Letters Patent above mentioned.

24 is a ring lying in a grove 25 in the portion 8 and having trunnions 26 at opposite sides. 27 is a protecting housing suitably secured to the bearing 23, for example, and 28 is a lever pivoted at its lower end thereon and slotted at opposite sides at 29 to receive the described trunnions 26. A spring 30 lies in each slot and engages at one end the trunnion. This lever is adapted for moving the coned portion 7 into engagement with the cone 19 of the clutch 12. The cone 7 is limited in one direction of its movement by a circumferential flange 31 thereon in position to engage one or more stops 32 of any desired form extending from the housing 27, for example, or some other fixed portion of the structure.

Opposite each notch 16 of the plate 15 is an opening 3' through the plate 3 in each of which is pivoted a dog 34 including an arm 35 which extends through said opening and lies normally within the notch 16 when the two clutch portions are in driving engagement which is the position shown in Fig. 1$^b$. A notch 36 in said arm 35 engages the inner corner of the plate at the bottom of the notches 16 as shown in Fig. 2 when the clutch portions are separated.

Each dog also includes an arm 37 and a spring 38 is interposed between said arm and the sleeve 4 which tends to move the arm 35 inward. 39 is a lever pivoted on the lever 28 including a hand piece 40 opposite the handle of the said lever 28, there being a spring 41 interposed between the two. The other end of the lever 39 is forked and supports a ring 42 by means of trunnions 43 at diametrically opposite sides. The said ring 42 is beveled on its interior surface and lies in close proximity to the arms 37 and is adapted when moved against the dogs to disengage all of them simultaneously from the plate 15.

The described sleeve 4 carries a ring 44 from whose diametrically opposite sides extend arms 45 each of whose extremities carries a trunnion 46 extending into slots 47 in extensions 48 of the lever 28. The clutch portion 3 is held elastically in the direction of the clutch portion 12 by means of a spring 49 interposed between the sleeve 4 and an adjusting nut 50 on the shaft 1.

In the normal driving relation the parts take the position shown in Fig. 1$^b$ with the arms 35 of the dogs lying in the notches 16 of the plate 15 and the fingers 6 engaging in the sockets 13. The spring 49 is adjusted for any desired tension by the nut 50 so that, for example, when the load upon the driven clutch portion exceeds a certain predetermined amount, or that for which it is set, the rotation of said driven portion is terminated by the ejectment of the fingers 6 from the sockets 13 due to the resistance of said driven portion, the tapered fingers riding up along the beveled sides of the sockets and against the pressure of the said spring 49. As this action takes place the arms 35 of the dogs 34 which drags along the bottom of the notches 16 will engage the inner edge of the plate 15, as shown in Fig. 2. The ends of the fingers will just clear the inner face of the clutch portion 12 so that the driving portion will rotate without interference. This constitutes the automatic disengagement of the clutch portions and the means of holding them separated.

I am enabled to manually disengage the clutch portion by moving the lever 28 toward the right as viewed in the figures which results in moving the sleeve 4 against the spring 49, the dogs engaging the edge of the plate 15 as before.

In restoring the driving relation of the clutch portions two methods are open for use. In one of such methods, when the load is not on the driven portion, the lever 40 is moved relatively to the lever 28 without moving the latter. This moves the ring 42 against the arms 37 of the dogs lifting all of said dogs from engagement with the plate 15. This permits the fingers 6 to move in the direction of the sockets 13 due to the spring 49 which they will enter as the sockets and fingers are brought in register.

When the inertia of the driven part due to the load would result in forcing the fingers out at such time, however, a steady and firm pressure on the hand lever 28 is required. The second method, then, is to force the said lever 28 toward the left to engage the cones 7 and 19, the load being thus gradually taken up whereupon by a movement of the lever 40 the dogs are lifted to release the clutch 3 and permit the fingers to engage in the sockets. The load is thus taken up in a positive manner without shock.

It is observed that in the last described method the lever 40 is not operated until the load is taken up and practically moving in unison with the driving parts; whereas, in the first action the lever 40 is moved first to release the dogs after which the lever 28 is moved.

As compared with the devices of one of my patents and the application referred to, it is now plainly seen that fewer parts are required resulting in a simplification of the structure and a very positive arrangement of the locking-out means as well, and it is observed, further, that the movement of the ring 42 is parallel to the axis of rotation to operate the dogs; whereas in the prior forms referred to friction is required to retard the rotation of certain parts. In the present instance friction for this purpose is not required and a very positive action takes place.

In Fig. 5, and those following, I show a modified structure in which 51 is the shaft corresponding to 1 in the other figures. 52 is the member which includes a sleeve 53 on said shaft. A flange 54 of said member 52 includes an annular flange extension 55 which is now the limiting part for the shiftable cone 56 corresponding to 7. The member 52 and the cone 56 are arranged to rotate together through lugs 57 and, as before the sleeve 53 is secured on the shaft by means of feathers 58.

59 is the clutch portion slidable upon the sleeve 53 and has the fingers 60 to enter sockets 61 in the clutch portion 62. In each finger is a groove or socket 63, Fig. 6, in which is pivoted a dog 64 including two arms 65 and 66, the arms 65 being forced outward by means of a spring 67. The arm 66 is in position to be engaged by a ring 68 corresponding to 42 in the other figures, except that it is merely made to abut against the arm 66 of the dog and forces the arm 65 inward instead of outward as in the said other figures. The shifting ring for the portion 59 is indicated at 69' and corresponds to 44 of the other figures.

Fig. 5 shows the driving relation of the clutch portions while Fig. 8 shows the disengaged position with the extremities of the arms 65 of the dogs bearing against the inner surface of the member 52.

The levers 69 and 70 corresponding to 28 and 39 are arranged substantially as already described and are operated in the same manner, it being observed that the arm 65 of the dog will be pushed inward from its position shown in Fig. 8 to clear the inner edge of the clutch member 52 so that it may enter the socket 63 of the finger carrying it and thus permit said finger to enter the socket 61.

In either form the slots in the extensions 48 of the levers 28 and 69, Figs. 2 and 5 respectively, are so disposed that the said levers can be moved to carry the friction cones into engagement before the levers 39 and 70 are operated to release the dogs. That is to say, the trunnions on the arms 45 of the ring 44 (Fig. 2), and those of the ring 69' (Fig. 5) lie at one end of their respective slots and the levers can be freely moved to bring the cones together.

The device may rotate in either direction and either clutch portion may be the driving part, the other being the driven.

In either direction of rotation the dogs perform their functions and special structures or reversible parts are not required when a change in direction of rotation is made.

My present structure requires but little manual effort in restoring the driving relation of the clutch parts since there is required but slight pressure of the rings 42, 69, to trip the dogs after the cones have been engaged.

Because of the compact arrangement of the structure the fingers 6, 60, can be made very short as compared with those of the former structures and thus there is less likelihood of shaking and chattering of the clutch portion in operation and the extremities of the fingers are less likely to tilt or strike upon the portions of the clutch portions 3, 62 during the rotation of the driving portion.

As has already been stated various changes may be made such as will accomplish the same results as can be accomplished by the two forms illustrated.

Having thus described my invention what I claim as new and desire to secure by Letters Patent is:—

1. In a device of the class described, the combination of a driving and a driven clutch portion adapted to automatically separate under overload, a dog, a part with which the dog is adapted to engage for maintaining the separated relation of the said portions, said part being fixed at all times as regards axial movement with respect to said dog, and mechanism movable parallel to the axis of rotation of the portions adapted to trip the dog and for positively carrying the said portions into driving engagement.

2. In a device of the class described, two clutch portions, a dog mounted on one of them, a part rotatable with the dog and engaged by the latter to maintain the separated relation of said portions, said part being fixed as regards axial movement with respect to said dog, means for tripping the dog, and means to automatically move one of the clutch portions into engagement with the other.

3. In a device of the class described, the combination of clutch portions, each including a friction cone, and each also including structures to positively engage one another, a dog mounted on one of the portions, a part fixed as regards axial movement with respect to said dog, manually operated means to carry the friction cones together in driving engagement, means to trip the dog, and means to automatically carry the said structures into driving engagement.

4. In a device of the character described, the combination of two clutch portions arranged to engage one another in positive driving relation and adapted to automatically separate under overload, said portions each including a friction portion, a dog carried by one of the first named portions arranged and adapted to operate automatically in the act of separation of those portions for holding them separated, and manually operated mechanism for carrying one of the friction portions into driving engagement with the other including means to trip said dog, and means to automatically move the automatically separated portions into engagement.

5. In a device of the character described, the combination of two engaging clutch portions adapted to separate under overload, each including a friction portion, a series of dogs carried by one of them adapted to engage a part of the device for holding the first named portions apart after separation, manually operated mechanism for positively forcing the friction portions into driving engagement and for tripping the dogs, and means constantly tending to move one of the said first named portions in the direction of the other.

6. The combination of a driving clutch portion, and a second clutch portion adapted to be engaged thereby, the portions adapted to separate from one another under overload, each portion including a friction part, a series of dogs pivotally mounted on one of the portions adapted to engage a part of the structure rotatable therewith upon separation of the portions, a lever for moving one of the friction parts into engagement with the other, manually operated means to trip the dogs, and elastic means for moving one of the portions into engagement with the other.

7. The combination of two separable clutch portions each having a friction portion, a dog pivotally mounted on one of them, its pivot lying substantially perpendicular to the axis of rotation of said portion, a part arranged to at all times rotate with said clutch portion and said dog, the said clutch portions being constructed whereby to separate under overload, the said dog at such times engaging the said part for holding the portions separated, a manually operated mechanism adapted to move the friction portions into engagement and to engage and move the dog from engagement with said part, and means to move one of the clutch portions toward the other.

8. The combination of two separable clutch portions each including a friction portion, a dog pivotally mounted on one of them and extending in the direction of the other, a shaft with which the portion having the dog is in fixed relation, said portion adapted to have movement along said shaft and adapted to separate from the other portion under overload, said dog adapted to engage a part of said shaft for holding the clutch portions in their separated positions, manually operated mechanism to move the friction portions into engagement and to disengage the dog from the shaft, and means to move one of the clutch portions in the direction of the other to effect reëngagement.

9. The combination of a shaft, a clutch portion rotatable with respect thereto, a second clutch portion adapted to engage the first and adapted to at all times rotate with said shaft and movable along the same, each said clutch portion including a part for frictional engagement whereby one may be driven from the other, a dog pivotally mounted upon the said second clutch portion and adapted to engage the shaft, and manually operated mechanism for disengaging the dog from the shaft and moving the friction parts into driving engagement.

In testimony whereof I affix my signature, in presence of two witnesses.

HARVEY V. GIBSON.

Witnesses:
L. M. THURLOW,
L. O. EAGLETON.